United States Patent [19]
Taylor

[11] 3,762,725
[45] Oct. 2, 1973

[54] WIRELINE STUFFING BOX AND SHEAVE

[75] Inventor: Donald F. Taylor, Dallas, Tex.

[73] Assignee: Otis Engineering Corporation, Dallas, Tex.

[22] Filed: May 20, 1971

[21] Appl. No.: 145,400

[52] U.S. Cl. .................. 277/32, 277/73, 166/84, 277/125
[51] Int. Cl. ..................... E21b 7/12, F16j 15/26
[58] Field of Search .............. 277/73, 31, 64, 125, 277/127, 32; 166/84, 82

[56] References Cited
UNITED STATES PATENTS

| | | | |
|---|---|---|---|
| 3,533,468 | 10/1970 | Lewis et al. | 277/73 X |
| 3,145,995 | 8/1964 | Adamson et al. | 166/84 X |
| 3,212,581 | 10/1965 | Marshall | 166/84 |
| 3,468,549 | 9/1969 | Wilson | 277/73 X |

Primary Examiner—Samuel B. Rothberg
Attorney—E. Hastings Ackley

[57] ABSTRACT

A wire line stuffing box having sealing gland means therein which is normally in an undistorted non-sealing position spaced from the wire line extending through the stuffing box, and which is compressed into sealing engagement with the wire line by hydraulic fluid pressure applied to opposite sides of piston means which longitudinally compresses the sealing gland and is subject to well pressure in a well. Means is provided for controlling the application of pressure to the sealing gland elements of the packing gland to control the friction with which the wire line is engaged by the sealing gland and the sealing effect of the packing elements. In addition, a flexible line sheave is disclosed which is provided with an overrunning structure permitting movement of the sheave wheel after movement of the flexible line is stopped to prevent damage to the line by stretching, abrasion or overstressing due to the momentum of the movement of the sheave wheel when movement of the line is stopped.

13 Claims, 7 Drawing Figures

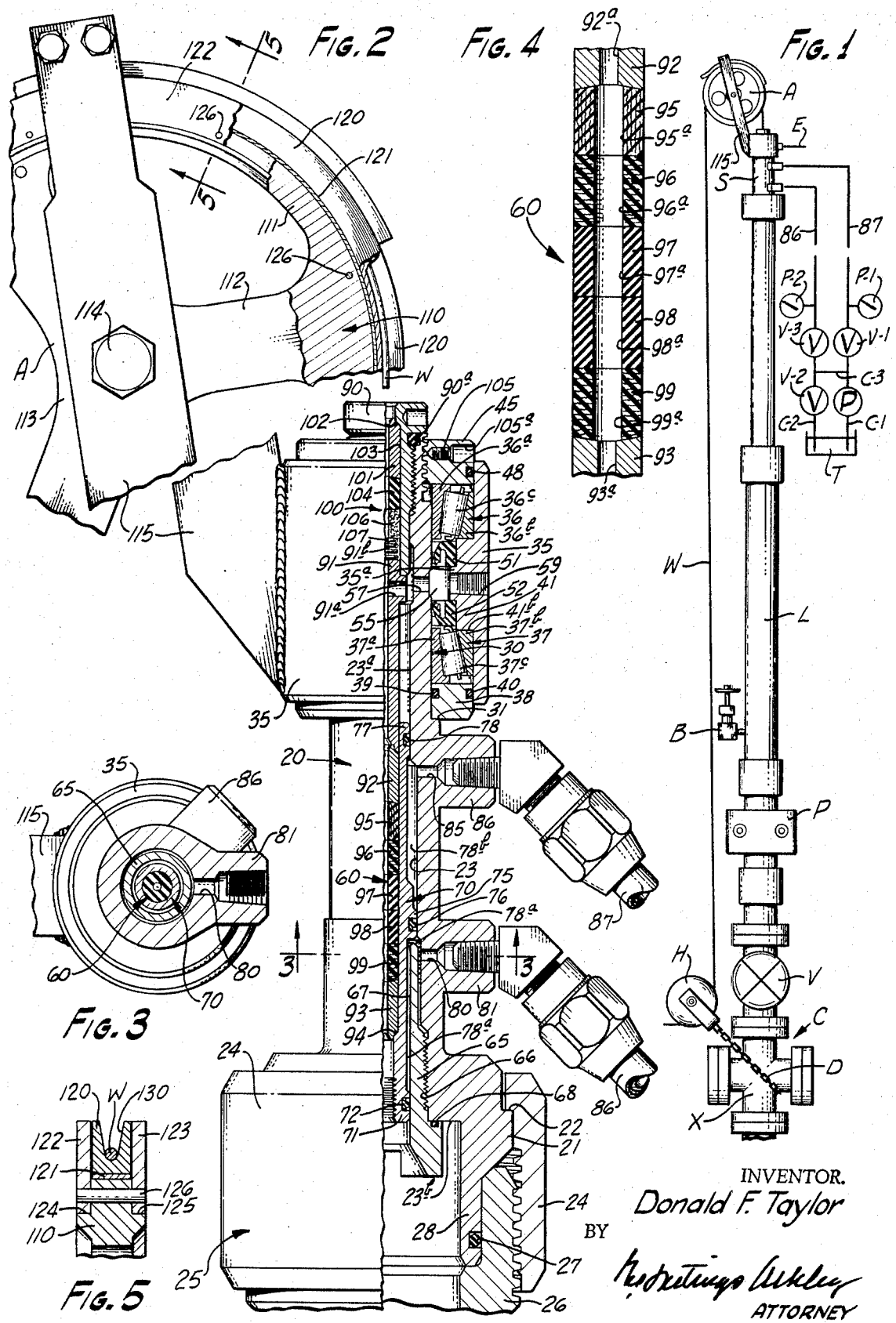

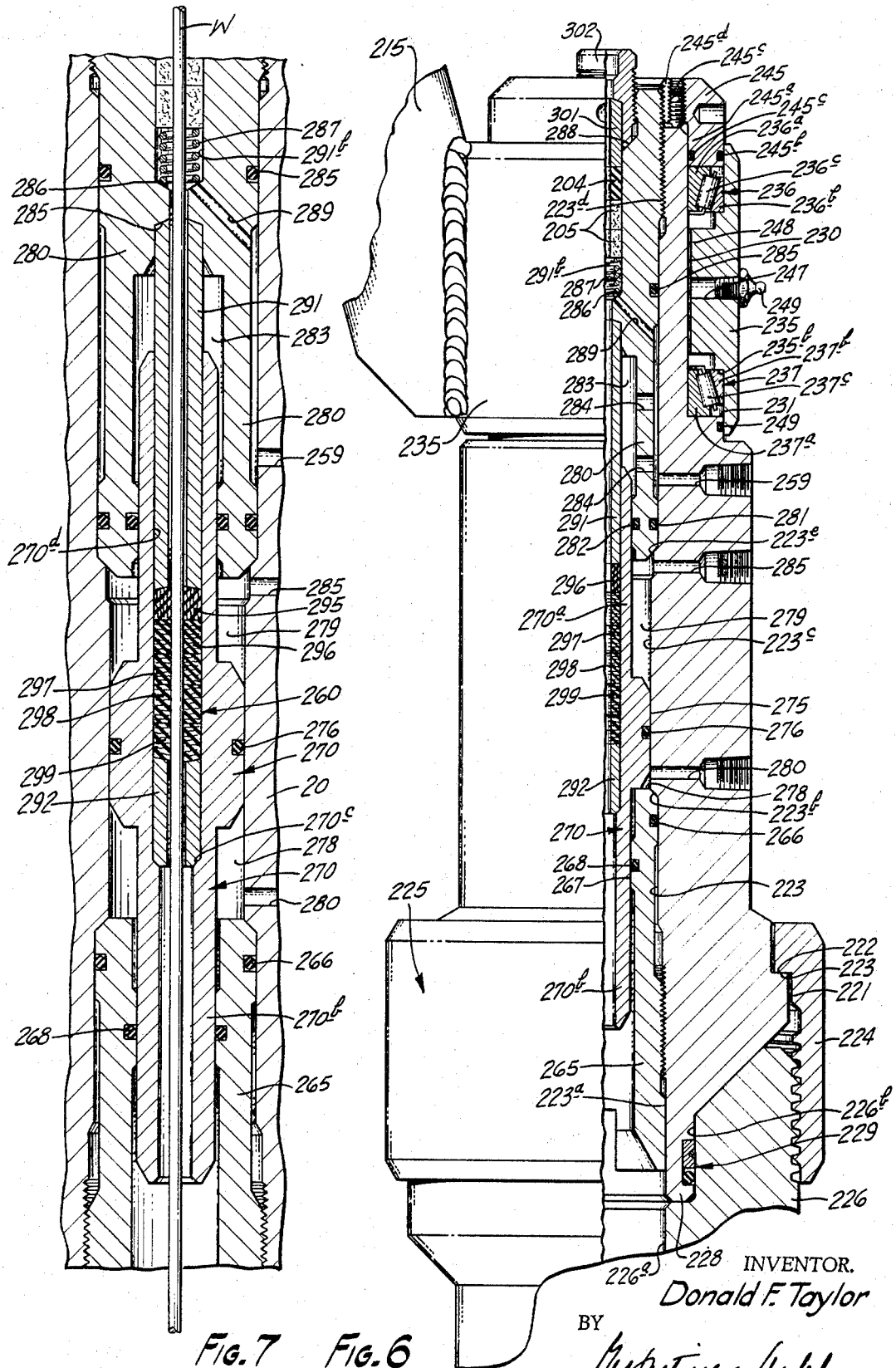

WIRELINE STUFFING BOX AND SHEAVE

This invention relates to new and useful improvements in wire line stuffing boxes and sheaves for moving flexible lines into or out of a well.

It is one object of the invention to provide a new and improved stuffing box for sealing around a flexible line which is lowered into and removed from a well bore to insert and operate and remove well tools in the well flow conductor.

A particular object of the invention is to provide a stuffing box of the character described wherein the sealing elements contained in the stuffing box for sealing between the stuffing box and the flexible line are moved into sealing enagement with the flexible line by hydraulically controlled means operable from a remote point for controlling the compression with which the sealing elements engage the wire line to reduce friction and assure a seal at low pressure with minimum drag on movement of the line through the stuffing box.

It is a further object of the invention to provide means for remotely controlling the compression of the sealing elements in a wire line stuffing box of the character described whereby the seal may be effected and its sealing engagement with the flexible line moving therethrough controlled from a remote point without the necessity of the operator mechanically or manually tightening the sealing elements at the stuffing box.

A still further object of the invention is to provide in a stuffing box of the character described means for lubricating and applying an anti-corrosive material to the flexible line as it is run through the stuffing box into the well and for stripping the same from the line as it is removed from the well.

Still a further object of the invention is to provide in combination with a stuffing box of the character described a sheave wheel for the flexible line which is designed to permit overrunning of the sheave wheel while the line is held stationary, to prevent stretching, breaking or otherwise damaging the line when the movement of the line into the well is stopped suddenly.

Still another object of the invention is to provide in a stuffing box of the character described improved sealing means for sealing between the stuffing box and the flexible line moving through the stuffing box.

Another object of the invention is to provide a system of fluid control for actuating the sealing means in the stuffing box to control the force with which the sealing means engages the flexible line moving through the stuffing box.

Still another object of the invention is to provide a device of the character described designed for extremely high pressure operation to withstand pressures of 10,000 pounds per square inch or more.

Still another object of the invention is to provide a stuffing box of the character described which may be readily attached to and disconnected from the lubricator used in connection with the running and pulling of wire line operated well tools in a well.

Still another object of the invention is to provide in a stuffing box of the character described auxiliary seal means for wiping the flexible line moving into or out of the well and confining the well fluids which pass through the primary packing assembly of the stuffing box to a chamber from which they are vented to a point for safe disposition, thus eliminating danger of fires or the like, and contamination, pollution, and so forth, as a result of leakage past the primary seal of the stuffing box.

Additional objects and advantages of the invention will be readily apparent from the reading of the following description of a device constructed in accordance with the invention, and reference to the accompanying drawings thereof, wherein:

FIG. 1 is a schematic view in elevation of a wire line tool lubricator mounted on a well and having a stuffing box constructed in accordance with the invention mounted on the upper end thereof and provided with control fluid operating means and a manifold for controlling actuation thereof;

FIG. 2 is an enlarged view, partly in elevation and partly in section, of the stuffing box of FIG. 1, and a portion of the wire line sheave or wheel of the stuffing box assembly;

FIG. 3 is a horizontal cross-sectional view taken on line 3—3 of FIG. 2;

FIG. 4 is an enlarged longitudinal sectional view of the packaging assembly used in the stuffing box of FIG. 2;

FIG. 5 is a fragmentary cross-sectional view, taken on line 5—5 of FIG. 2, showing the construction of the overrunning sheave rim for the sheave wheel of the stuffing box;

FIG. 6 is an enlarged vertical sectional view, partly in elevation and partly in section, of a modified form of the stuffing box for use with an extremely high pressure well; and, FIG. 7 is a longitudinal vertical sectional view of the sealing portion of the stuffing box of FIG. 6.

In the drawings, FIG. 1, a well head Christmas tree C having a flow cross X and a crown valve V is shown as having a lubricator L connected to the upper end of the crown valve and extending upwardly therefrom in axial alignment therewith and with the well flow conductor therebelow. The bore of the lubricator is open and communicates with the bore of the crown valve. If desired, a blow out preventer P is provided in the lower portion of the lubricator and a bleeder valve B, at one side of the lubricator, is provided for exhausting pressure from the lubricator when desired, in the usual manner. At the upper end of the lubricator, which may be formed of two or more lengths of tubular conductor, is provided a stuffing box S which is a sealing assembly through which the flexible wire line W is threaded for movement into and out of the lubricator and the well bore therebelow. A suitable rotatable sheave A is mounted on the upper end of the stuffing box, over which the flexible line W is bent after extending inwardly toward the well from a suitable reel or the like (not shown) by means of which it is wound into and out of the well. The sheave or pulley H is connected to the Christmas tree by means of a chain D or the like connected to the flow cross X, so that the line may extend upwardly from the pulley or sheave H to the sheave A and over the sheave A downwardly through the stuffing box S into the lubricator L, and thence into the bore of the well therebelow. The foregoing generally comprises the usual lubricator and stuffing box installation for mechanically or manually operating wire line equipment for lowering well tools into or pulling them out of the well flow conductor under pressure.

In wells having high pressures of the order of 10,000 or 15,000 pounds per square inch or more, the pressure acting across the sealing element of the stuffing box S will ordinarily so compress the packing of the sealing element as to create a very great frictional force engaging the wire line extending therethrough, which will prevent its ready movement through the stuffing box into and out of the well. In addition, in order to effect a seal at low pressure, the sealing elements must be compressed substantially against the wire and, upon the application of the higher pressure thereacross, will be further compressed to more tightly grip and engage the wire line to prevent movement of the wire line into and out of the well through the stuffing box. If, for any reason, the pressure is such that the sealing elements of the stuffing box grip the flexible line so tightly that it cannot be moved readily into and out of the well, the well tools being operated by means of the flexible line may be held in a position to interfere with the valves of the Christmas tree or the like, and so prevent closing off flow from the well and removal of the tools from within the flow conductor and from within the lubricator. In addition, under low pressure conditions, a sealing element may not adequately engage the flexible line to seal therebetween, and so permit leakage of combustible well fluids from the well flow conductor through the lubricator and the stuffing box to the exterior thereof, and result in a fire hazard at the well head which is extremely dangerous. Also, such leakage may cut out the packing elements of the stuffing box which could create a condition permitting the blowing out of the well fluids from the well through the stuffing box of the lubricator.

Furthermore, a deep well in which the wire line is lowered for several thousand feet into the bore of the well through the stuffing box, may result in the complete destruction of the sealing elements of the stuffing box, which would also permit leakage of the well fluids past the seals and result in a fire hazard or danger of a blowout.

By use of the stuffing box of this invention, an amplified volume of packing is available to seal between the stuffing box and the flexible line moving therethrough to permit the insertion and removal of extremely long sections of flexible line into and out of the well without completely wearing out the sealing elements in the stuffing box so that there is no need to repack the stuffing box during the usual operation. Instead, the packing may be moved into controlled sealing engagement with the flexible line moving through the stuffing box under conditions which result in a minimum of friction and wear on the packing elements of the stuffing box and permit the running of extremely long lengths of flexible line into and out of the well without destruction of the sealing elements.

Likewise, the overrunning sheave rim section of the stuffing box wheel or sheave assembly permits the heavier central spoke and rim section of the wheel to turn a limited distance without moving the sheave rim portion which supports and is in engagement with the flexible line, so that the movement of the line into and out of the well may be stopped abruptly, while the spoke and wheel portion of the sheave assembly continue to rotate for a limited arc until the same stops without causing application of a force stretching, tensioning or otherwise affecting the flexible line supported by the sheave or rim section of the wheel assembly.

The movement of the wheel portion relative to the sheave rim portion of the sheave assembly thus results from the fact that the sheave rim portion has a relatively small mass, though of a material highly resistant to wear, while the wheel rim portion may have substantially lesser mass and independent movement, but is preferably of a light-weight material such as aluminum. In addition, a low friction bearing sleeve is provided on the wheel between the wheel rim and the sheave rim, to permit such overrunning of the wheel and rim with respect to the sheave rim section of the assembly. The rim portion may be of titanium metal, which is highly resistant to wear and which is also of low mass and weight, while of high strength.

In FIG. 2 an enlarged vertical view, partly in elevation and partly in section, of the stuffing box of the invention is shown, wherein an elongate tubular body 20 which has an external enlarged flange 21 at its lower end is provided with an upwardly facing shoulder 22 against which the collar nut 24 of a union 25 engages to clamp the enlarged flange at the lower end of the housing to the upper end of a union sleeve 26 having external threads engageable with the internal threads of the collar nut, in the manner shown in FIG. 2. An O-ring seal member 27 is disposed in an external annular groove in the reduced lower depending skirt portion 28 of the enlarged flange of the body, and seals between the body and the sleeve of the union in the usual manner.

The upper end of the body 20 is formed with a reduced bearing and sealing surface section 30 above a shoulder 31, upon which a sheave supporting sleeve 35 is rotatably supported. An upper bearing 36 and a lower bearing 37 are disposed between the reduced surface 30 of the housing and the sleeve, the lower bearing engaging and being supported by a supporting ring 38 engaging the upwardly facing shoulder 31 at the lower end of the reduced surface 30 and having an internal seal ring 39 and an external seal ring 40 mounted in internal and external annular grooves, respectively, in said supporting ring and sealing between the body 20 and the sleeve 35. The lower bearing 37 has an inner race 37a and an outer race 37b between which a plurality of rotatable frustoconical rollers 37c are disposed in the usual manner to provide anti-friction support for the sleeve 35 on the reduced portion 30 of the body. Similarly, the upper bearing 36 has an inner race 36a and an outer race 36b, between which rollers 36c are disposed to provide anti-friction support for the upper portion of the sleeve 35. A retaining lock ring 45 is threaded onto the upper end of the body and engages the upper end of the inner race 36a of the upper bearing assembly 36 to confine the bearings 36 and 37 between the supporting ring 38 and the retaining ring 45, to provide for adjustment of the compression therebetween and to confine the bearings in place on the reduced upper portion 30 of the body. An internal annular flange 41 is provided medially in the bore of the sleeve 35, and its opposed upwardly and downwardly facing shoulders 41a and 41b engage the outer race 36b of the upper bearing and the outer race 37b of the lower bearing, respectively, to support the sleeve between the bearings for anti-frictional rotation on the body 20. An O-ring seal member 48 is mounted in an external annular recess formed in the lock ring 45 and seals between the lock ring and the sleeve 35 to retain lubricant between the sleeve and the body in the usual manner.

A pair of opposed substantially V-type seal members 51 and 52, respectively, are disposed between the upper portion of the internal flange 41 and the lower portion of such flange for sealing between the flange and the exterior of the reduced portion 30 of the body for a purpose to be hereinafter more fully explained. The V-shaped seal rings 51 and 52 are confined between the upper outer race 36b and the lower outer race 37b of the bearing assembly 36 and 37, respectively, and opposed shoulders formed by an internal annular reduced medial flange 35a formed in the bore of the rotatable sleeve 35. Therefore, a pressure chamber 55 is provided between the seal members 51 and 52 and between the exterior of the reduced portion 30 of the body and the bore of the flange 35a in the sleeve 35. A lateral port or opening 59 is formed in the wall of the sleeve 35 communicating with the chamber 55 and has screw threads therein by means of which a suitable conductor (not shown) may be connected thereto. Such a conductor is shown in FIG. 1 at E, connected to the stuffing box S at the upper end of the lubricator L in FIG. 1. In addition, a lateral port 57 is provided in the wall of the reduced portion 30 of the body 20 communicating with the chamber 55 and with the bore 23a of the body 20.

A packing assembly 60 is disposed in the bore 23 of the body 20 of the stuffing box S, and comprises a lower retaining sleeve 65 which is threaded into the enlarged threaded lower end portion 66 of the bore 23 of the body and provides a stop shoulder at its upper end and a sealing surface 67 in its bore. An O-ring seal member 68 is confined in an external annular groove on the upper surface of the enlarged lower nut portion of the sleeve and seals between the sleeve and the downwardly facing shoulder 23b of the body.

An elongate actuating piston sleeve 70 is disposed in the bore 23 of the body 20 and has an enlarged piston head 71 at its lower end in which an annular seal ring 72 is disposed in an external annular groove for sealing between said piston head and the sealing surface of the bore 67 of the retaining and stop member 60. Intermediate its ends the piston member 70 is formed with an enlarged external annular piston flange 75 having a seal ring 76 disposed in an external annular groove in said piston flange and sealing between said piston flange and the bore 23 of the body 20. The upper end of the sleeve has an external annular piston head 77 formed thereon and a seal ring 78 is disposed in an external annular recess in said piston head 76 and seals between such reduced upper piston head 76 and the reduced bore 23a at the upper portion of the bore of the body 20.

Thus, a lower pressure chamber 79a is formed between the lower piston head 71 and the central flange piston 75 and an upper chamber 78b is formed in the bore 20 of the body between the central piston 75 and the upper reduced piston head 77. The diameter of the central piston formed by the flange 75 is such that the area sealed off by the piston ring 76 in the piston head 75 is approximately twice the cross-sectional area sealed off by the lower seal ring 72 in the piston head 71. Similarly, the cross-sectional area sealed off by the upper piston head 77 and the seal ring 78 is equal to that of the lower piston head 71 and seal ring 72, so that the differential areas of the pistons exposed in the two chambers are equal.

A lateral inlet and outlet port 80 is formed in a laterally projecting boss 81 for providing a path of communication or flow of control fluid pressure through said port 80 into the chamber 78a in the bore of the body between the central piston 75 and the lower piston 71. Similarly, an upper lateral port 85 is formed extending inwardly through a boss 86 on the body and in communication with the upper chamber 78b to permit entry and withdrawal of fluid pressure into the chamber 78b between the central piston and the upper piston. A control fluid conduit 86 is connected by suitable threaded couplings into the threaded enlarged threaded outer end of the port 80 in flow communication therewith for conducting control fluid into and out of the chamber 78a. Similarly, an upper control fluid conduit 87 is connected by means of suitable threaded couplings to the lateral port 85 in the boss 86 and provides means for conducting control fluid into and from the upper chamber 78b in the bore of the body between the central piston 75 and the upper piston 77 of the sleeve 70. A packing gland nut 90 is threaded into the threaded upper end of the reduced bore 23a of the body 20 and engages an elongate tubular compressing sleeve 91 which extends downwardly in the bore of the body into the bore of the elongate tubular packing cylinder 70 and engages a bushing or ring 92 disposed in the upper end of the bore and engaging the upper end of the packing assembly in the bore of the packing piston sleeve. A plurality of seal rings 95, 96, 97, 98 and 99 are confined between the upper compression ring 92 and a lower compression ring 93 which seats on an internal annular shoulder 94 in the bore of the packing sleeve. The packing rings preferably include an upper packing ring 95 which is formed of a spirally wound fabric or woven material treated with an elastomeric sealing material which provides for lateral flexing without destruction of the fabric and has high extrusion resistance. Beneath this upper sealing ring 95 is a sealing ring 96 formed of an elastomeric materail having a horizontally disposed plurality of layers of fabric of fiberglass or nylon or the like, sealed and bonded together with an elastomeric sealing material which permits lateral compression and sealing engagement of the ring with the flexible line extending therethrough under compression, and which resists wear to a large degree. Two central seal rings 97 and 98, which are substantially identical in composition, are disposed below the seal ring 96 and between such ring and a lower seal ring 99 which also has horizontally disposed fabric layers joined or bonded in an elastomeric sealing material identical to the seal ring 96 and supported by the lower retaining ring or compression ring 93. Any other combination of seal rings and materials may be disposed between the compression rings to provide the desired sealing effect. It is preferable that the rings 97 and 98 be formed of glass-filled urethane or the like, which is a low friction, high wear resistant material and which may be readily compressed by means of the piston sleeve 70 into sealing engagement with the flexible line extending through the bore of the rings. Obviously, the piston 70 may be moved upwardly in the bore 20 of the body toward the upper end thereof and such movement will compress the packing rings 95 through 99 of the packing assembly 60 to distort the same inwardly into sealing engagement with the flexible line W extending therethrough.

*The sleeve* 91 is held in place in the reduced bore 23a of the body by the gland nut 90 which is held in place by the lower end of the gland nut 90 threaded into the upper end of the bore 23a of the body, and an O-ring seal member 90a is disposed between the upper end of the gland nut and the upper end of the body to seal therebetween. Within the bore of the gland nut 90 is a wiper assembly 100 consisting of a retaining sleeve or ring 101 engaging a downwardly facing shoulder 102 in the bore 103 of the gland nut and confining a resilient elastomeric seal ring 104 in such bore for engagement with the flexible line W extending therethrough. Wiper felt member 106 are disposed below the elastomeric ring 104 and a helical coil spring 107 is confined between the upper end of the sleeve 91 and the lower end of the felt wipers 107 for biasing the wipers toward the resilient members and compressing the resilient member into wiping engagement with the flexible wire line W extending therethrough. The wiper assembly provides for directing well fluids which pass the packing assembly 60 into the bore of the sleeve 91 outwardly through the lateral port 91a in the sleeve and communicating with the port 57 in the body and the lateral vent port 59 in the rotatable sleeve 35, from which such fluids are directed to the exhaust conduit E for conduction to a suitable remote point for disposal. Likewise, if desired, an anti-corrosive material may be introduced through the exit line E into the chamber between the wiper assembly seal 104 and the upper end of the packing assembly 60 for treating the flexible wire line moving therethrough to prevent corrosion or erosion, and lubricating the same, as it goes into or out of the well flow conductor.

In addition, the bore 92a of the upper metallic compression sleeve 92, as well as the bore 93a of the lower compresion sleeve 93, are slightly larger than the diameter of the flexible line W extending therethrough. The bores 95a, 96a, 97a, 98a and 99a of the seal rings 95 through 99, respectively, are also larger than the bores 92a and 93a of the gland rings 92 and 93, respectively, so that the flexible line will not drag on the packing rings to wear the same or interfere with movement of the flexible line through the stuffing box, while the sealing rings may be readily compressed longitudinally to deform into sealing engagement with the flexible line extending therethrough upon application of pressure to the sleeve 70.

In addition, the wiper gland 100 in the bore of the gland nut 90 is likewise approximately the same bore as that of the bores 92a and 93a of the glands 92 and 93, respectively, for the same purpose. The wiper seal ring 104 and the felts 106 may be approximately the same size as the flexible line, if desired, to assure wiping under all conditions and to assure confining liquids in the chamber 91b therebelow.

A retaining lock screw 105 is threaded into a lateral threaded opening 105a in the upper end of the retaining ring 45 to lock the retaining ring in place on the body and maintain the adjustment of the bearings 36 and 37 in the rotating sleeve.

The sheave wheel A comprises a wheel 110 having a rim 111 and spokes 112 with a hub 113 mounted on a cross pin axle 114 carried by a swingable arm 115 secured to the rotatable sleeve 35, as shown in FIGS. 1 and 2. Thus, the wheel 110 is readily rotatable upon the axle 114 carried by the arm 115 and is swingable about the vertical axis of the lubricator on the sleeve 35. A sheave groove ring 120 formed of titanium, or other light weight high strength wear resistant material, is mounted on the exterior of the rim 111 of the wheel 110 and a friction reducing or anti-friction bearing bushing 121 of metal coated with tetrafluoroethylene or Teflon or other suitable anti-friction plastic material is disposed between the exterior cylindrical surface of the rim and the bore of the sheave ring, whereby the sheave ring is readily rotatable on the rim of the wheel. For retaining the sheave ring on the wheel a pair of retaining flanges 122 and 123, respectively, are secured on opposite sides of the sheave ring in suitable external annular recesses 124 and 125 formed on the exterior of the rim of the wheel. The flanges are held in place by shear pin or retaining rivets 126 extending through suitable apertures in the flanges and in the rim of the wheel or by other suitable retaining means.

A flexible wire line W is readily receivable in the groove 130 of the sheave ring 120 and will cause the sheave ring to rotate with the wire line when the wire line is moved. Ordinarily, the wheel 110 will likewise rotate with the sheave ring 120 until the movement of the flexible line is stopped when the same has reached a position in the well at which the wire line well tools are desired to be located. The stopping of movement of the wire line will stop movement of the sheave ring 120 and the anti-frictional bearing sleeve or bushing 121 will permit the wheel 110 to rotate within the sheave ring 120 until the momentum of rotation has ceased and the wheel ceases such rotation. This permits the flexible wire line to stop without strain and the wheel to continue to rotate until its momentum has been expended and it stops rotating, which reduces wear and tear on the line and strain which might result in damage to or breakage of the line.

Obviously, the diameter of the bore of the bushing rings 92, 93 and 101, as well as the groove 130 in the sheave ring may be reduced or enlarged to conform to the size or diameter of the flexible line W being run over the sheave and through the stuffing box. The bore of the retaining rings is preferably such that it will reduce extrusion of the sealing rings therethrough under pressure, but will still not interfere with free movement of the flexible line. Likewise, the free rotation of the sheave ring 120 will reduce wear on the line as it moves around the sheave as it is moved into and out of the well bore.

In the use of the device, a suitable control fluid pressure may be introduced through the lower control fluid conduit 86 into the chamber 78a below the central piston 75 to move the piston sleeve upwardly and compress the packing gland assembly 60 into sealing engagement with the flexible line. The amount of compressive force applied to the packing gland assembly may be controlled by applying a counteracting pressure through the upper control fluid line 87 into the chamber 78b to act downwardly on the central piston 75 to resist compressive force applied to the packing assembly. Thus, a positive seal between the packing and the flexible line extending therethrough may be effected with a minimum of actual frictional engagement between the packing rings and the flexible line while the positive seal is maintained. Likewise, if desired, an excessive force may be applied to positively close off flow in any emergency, if desired. Also, when the pressure of the well fluid acting on the sealing assembly is sufficiently great, the pressure in the upper chamber 78b may be greater than that in the lower chamber 78a and so resist the force applied to the piston sleeve 70 by the well fluid pressure, and so reduce the compressive force applied to the packing seal rings surrounding the flexible line to reduce the frictional engagement of the seal rings with the flexible line and permit ready movement of the line into and out of the well bore without losing the sealing engagement between the seal rings and the flexible line.

Obviously, the most desirable operation would provide for the application of just enough compressive force to the seal rings to move them into sealing engagement with the flexible line to effect a seal without applying a high frictional force to the line, so that the line may move therethrough with a minimum of frictional drag while maintaining a positive seal between the seal rings and the line.

To effect control of the operation of the piston sleeve 75, a suitable pressure control fluid manifold and power source may be provided, as shown in FIG. 1. A tank T which comprises a reservoir of control fluid is connected to a pump P by means of a conductor or suction line C-1, which then is connected to a valve V-1 and the upper control fluid conduit 87. A pressure gauge P-1 may be connected to the control fluid line 87 between the valve V-1 and the lubricator L. A return conductor C-2 is connected to a valve V-2 which is in turn connected to a valve V-3 and thence to the lower control fluid condctor 86 which leads to the lower chamber 78a of the lubricator. A pressure gauge P-2 is connected in the control fluid line 86 between the valve V-3 and the lubricator for recording pressure of the fluid in that line, if desired. A cross-flow conductor C-3 connects the conductor C-1 between the pump and the valve V-1 with the conductor C-2 between the valve V-2 and the valve V-3, whereby control fluid pressure may be applied in any desired manner through the control fluid conduits to the chambers 78a and 78b on opposite sides of the central piston 75 of the piston packing compressing sleeve 70 for controlling the force with which the sleeve acts upon the packing rings of the packing gland assembly 60. Thus, any desired compressive force may be applied to the seal rings 95 through 99, respectively.

It will thus be seen that the force applied by means of the packing piston sleeve 70 to the packing gland assembly 60 to compress the sealing rings 95 through 99, inclusive, may be controlled by controlling the flow of control fluid from the pump to the chamber 78a and 78b by means of the valves V-1, V-2 and V-3, respectively. The pressure in the two chambers is indicated on the gauges P-1 and P-2. Thus, any desired differential may be applied to the piston sleeve to control compression of the sealing rings and their engagement with the flexible line passing through the stuffing box assembly.

It is apparent that a stuffing box assembly has been provided which may be controlled from a remote point to positively control the force with which the sealing elements or rings engage the flexible line passing therethrough to control friction between the line and the sealing rings and to limit the compression of the packing and the force with which the packing engages the lines, so that a seal is positively maintained with a minimum of pressure and frictional engagement of the sealing means with the wire.

It will also be seen that a sheave wheel has been provided which permits overrunning of the sheave wheel with respect to the sheave ring when movement of the flexible line is stopped to permit the momentum of the wheel to be exhausted without damage to the line. Also, it will be seen that the packing elements or seal rings of the gland 60 are adapted to seal under conditions of high pressure with low wear and low friction, and that the rings are also adapted to return to their normal position out of engagement with the flexible line, when desired, to permit free movement of the line through the stuffing box. It will further be seen that a wiper and gland assembly is provided for preventing leakage of well fluids from the stuffing box and for conducting any such fluids which pass the packing gland through an exhaust conduit for disposal at a point spaced from the well head. Likewise, the exhaust line may be utilized to inject a chemical treating compound for lubricating or preventing corrosion of the flexible line, when desired.

A modified form of the stuffing box and packing assembly of the invention is shown in FIGS. 6 and 7, wherein the tubular stuffing box body 220 has an enlarged external annular flange 221 at its lower end providing an upwardly facing shoulder 222 which is engaged by the downwardly facing clamping shoulder 223 of the clamping ring 224 of the union 225 by means of which the stuffing box body is connected to the well. The lower pin sleeve portion 226 of the union is externally threaded and is received in the internal threads of the clamping sleeve 224 of the union 225 for positively clamping the lower end of the body 220 to the pin sleeve, as shown in FIG. 6. A depending annular flange or skirt 228 has an external annular packing assembly 229 disposed in an external annular groove thereon for sealing between the skirt and the enlarged upper portion of the bore 226b of the bore 226a of the sleeve 226 for sealing therebetween. The seal assembly may consist of an O-ring and a metallic or plastic anti-extrusion ring for positively sealing between the skirt and the sleeve under all conditions of pressure.

The upper end of the body 220 is reduced in diameter to provide a rotatable bearing and sealing surface 230 having an upwardly facing shoulder 231 at its lower end which supports the inner race 237a of a lower bearing 237, while the outer race 237b of the bearing engages a downwardly facing shoulder 235b in the enlarged lower bore of the rotatable supporting sleeve 235. An upper bearing 236 has its inner race 236a engaging the reduced surface 230 of the body, while the outer race 236b engages the enlarged upper bore of the rotatable sleeve 235 in the same manner as that of the form previously described. Suitable rollers 236c in the upper bearing and 237c in the lower bearing provide anti-friction means between the races to permit free rotation of the sleeve 235 on the body. A retaining ring 245 has a depending skirt 245a provided with external and internal seal rings 245b and 245c, respectively, which seal between the retaining ring and the upper end of the reduced upper bearing and sealing surface portion of the body and the enlarged upper bore of the rotatable sleeve 235 to confine and to adjust the movement of the bearings in the sleeve 235 and communicates with the bore of the sleeve in the central portion of an internal annular flange 248 in the sleeve, and a suitable grease fitting 249 is threaded into the lateral port to provide for lubrication of the bearings 236 and 237 therein. A suitable O-ring 249 is disposed in an external annular groove on the upper end of the body below the lower shoulder 231 and seals between the body and the lower end of the rotatable sleeve to retain lubricant in the sleeve to lubricate the bearings.

An elongate tubular guide and sealing sleeve 265 is threaded into the enlarged lower portion 223a of the bore 223 of the body 220, and at its upper end abuts an inclined shoulder 223b at the lower end of the reduced upper portion 223c of the bore of the body 223. An external annular seal ring 266 is provided on an external annular flange at the upper end of the guide and packing sleeve 265 disposed in an external annular groove in said flange and sealing between the upper end of the sleeve and the bore 223 of the body. An internal annular flange 267 is formed in the bore of the sleeve 265 and a sealing ring 268 is disposed in an internal annular recess formed centrally in such flange and seals between the sleeve 265 and the lower cylindrical end 270b of an elongate tubular packing compressing piston sleeve 270.

The packing compressing sleeve 270 has a central external annular flange providing a piston 275 which has an external annular recess in which is disposed a seal ring 276 for sealing between the piston and the reduced bore 223c of the body to provide a lower pressure fluid chamber 278 between the flange 275 and the lower seal ring 266. The upper tubular neck 270a of the packing compressing sleeve 270 telescopes into the lower end of a packing gland sleeve 280 which has an external annular threaded flange at its upper end threaded into the enlarged upper bore 223d of the body 220. The lower end of the gland sleeve engages a beveled shoulder 223e in the bore of the body above the reduced bore 223c thereof and limits downward movement of the gland sleeve. An external seal ring 281 and an internal seal ring 282 mounted in external and internal annular grooves formed in internal and external flanges on the lower end of the gland seal between the body and the gland sleeve and between the gland sleeve and the upper neck portion 270a of the piston 275 to define a chamber 279 between the seal rings 281 and 282 and the seal ring 276 on the central piston 275 of the sleeve 270.

The retaining ring 245 has an internal annular flange 245d which is threaded onto the threaded upper end of the gland sleeve 280, and a lock screw 245b threaded through a longitudinal threaded opening 245c in the locking ring 245 engages the upper end of the reduced upper portion of the body to lock the locking ring in position holding the bearings in suitable adjusted relationship and the sleeve 235 in proper position for free rotation on the body. An external annular seal ring 285 disposed in an external annular groove in the midportion of the gland sleeve 280 seals between the gland sleeve and the upper portion of the bore of the body 220.

The packing gland assembly 260 is mounted in the bore of the tubular piston sleeve 270 and is held in place therein by a retaining gland sleeve 291 which telescopes into the upper end of the bore of the piston sleeve 270 and engages the upper sealing ring 295 of the packing gland assembly. A plurality of sealing rings 296, 297, 298 and 299 are confined between the lower end of the gland sleeve 291 and a retaining supporting gland 292 at the lower end of the gland assembly 260 which engages an upwardly facing beveled seat 270c in the bore 270d of the piston sleeve 270. Movement of the piston sleeve upwardly compresses the packing rings 295 through 299, inclusive, between the ring 292 and the sleeve 291 in the same manner as the form previously described. Upward movement of the retaining packing gland sleeve 291 is limited by the engagement of the upper end thereof with a downwardly facing shoulder 285 in the bore of the packing gland 280.

A wiper assembly comprising a resilient elastomeric seal ring 204 and felt wipers 205 is confined in the enlarged upper portion of the bore of the gland sleeve 280 and is held in place therein by a retaining bushing sleeve 301 which is compressed downwardly by a gland nut 302 which is threaded into the enlarged upper end of the bore of the gland sleeve 280 and has its lower end abutting against a shoulder 288 in such bore. A helical coil spring 287 is confined between an upwardly facing shoulder 286 in the bore of the packing gland sleeve 280 and the felt wiping sleeves 205 therein. An inclined lateral flow port 289 is provided in the wall of the gland sleeve 280 which communicates the bore or chamber 291b below the wiper seal 204 with the exterior of the gland below the seal ring 285 and above the external and internal seal rings 281 and 282 at the lower end of the gland sleeve.

The chamber 283 in the bore of the gland sleeve 280 between the sleeve 291 and the gland sleeve and above the upper end of the piston sleeve 270 communicates with the exterior of the gland sleeve through a plurality of lateral ports 284 and also thereby communicates with the chamber 291 through the port 289.

A lateral exhaust port 259 formed in the wall of the body 220 is threaded to receive an exhaust conduit E in the same manner as that of the form previously described to conduct well fluids which pass the sealing assembly 260 for conducting such fluids to a remote point for disposal. Also, if desired, suitable lubricant or anti-corrosion material may be introduced through the port 259 into the chamber to act on the flexible line passing through the assembly and the chamber 291b below the wiper seal and felts 204 and 205, respectively, for treating the flexible line as it is moved into and out of the well bore.

A lower lateral port 280 formed in the wall of the body 220 communicates with the chamber 278 below the piston 275 and a suitable control fluid conduit (not shown) is connected thereto by suitable fittings for conducting control fluid into and out of such chamber. An upper control fluid port 285 is formed in the wall of the body 220 and communicates with the chamber 279 in the bore of the body above the piston 275, and a suitable control fluid line (not shown), such as the line 287 of the form first described, may be connected to this lateral port for conducting control fluid pressure into and out of the chamber 279 for controlling actuation of the piston sleeve 270 in the same manner as that of the form previously described.

The rotatable sleeve 235 is readily rotatable on the upper end of the body and the arm 215 secured to the sleeve may carry a wheel such as the sheave A of the form previously described, for directing movement of the flexible wire line into and out of the stuffing box and through the packing assembly 260 therein.

The function of the packing assembly of the device just described is identical to that of the form first described, the piston sleeve 270 moving to compress the packing assembly 260 against the gland sleeve 291 in the same manner as the packing of the form first described was compressed to seal against the flexible line W extending through the assembly. It will therefore be seen that this modified form of the stuffing box assembly provides an extremely high pressure body and seal assembly which is readily operable by control fluid pressure applied to opposite sides of the piston head 275 to adjust the compressive force applied to the packing assembly 260 engaging the flexible line W passing therethrough. All other features of the form first described are encompassed within the structure just described, but a simpler stronger body and other structural elements has been provided to take care of the higher pressures encountered.

It is believed readily apparent that the magnitude of the control fluid pressure differential applied to the piston sleeve 270 to compress or release the compression of the packing assembly 260 is dependent upon the magnitude of the well fluid pressure present in the stuffing box and acting upon the piston sleeve tending to move the same upwardly. The well fluid pressure acting on the piston sleeve will be that sealed off between the flexible line W and the O-ring 268 sealing around the exterior of the lower portion of the sleeve 270 below the piston head 275. The control fluid pressure acting on the effective area of the piston sleeve in opposition to the well fluid pressure will act on the effective annular area of the piston head 275 delineated by the seal ring 276 on the piston head and the O-ring 282 sealing against the upper portion of the piston sleeve 270, so that control fluid in the chamber 279 acts against the annular area defined by such O-ring seals. Thus, if the well fluid pressure is high, as will exist in high pressure stuffing boxes such as are illustrated in FIGS. 6 and 7, which are designed for working with well pressures up to 15,000 pounds per square inch, the annular effective area of the piston head 275 between the O-ring 276 and the O-ring 282 may be several times the cross-sectional area of the piston sleeve 270 between the flexible line W and the lower O-ring seal 268 sealing against the lower portion of the piston sleeve below the piston head. Therefore, if the well fluid pressure is 15,000 pounds per square inch, and if the annular effective area of the piston head 275 is three times that of the area sealed off by the O-ring 268 and the packing assembly 260, it will require only about 5,000 pounds per square inch control fluid pressure directed into the chamber 279 to prevent compressive movement of the piston sleeve 270. Thus, the larger the ratio between the effective area of the piston head exposed in the chamber 279 as against the area of the piston sleeve between the O-ring 268 and the flexible line subjected to the well fluid pressure, relatively low control fluid pressure is required for actuation of the seal sleeve to resist compression of the packing assembly 260. It will be understood, of course, that the packing assembly 260 is first compressed into sealing engagement with the flexible line by fluid pressure directed into the chamber 278 below the piston head 275 and acting on the annular effective area of the piston between the O-ring 276 on the piston head and the seal 268 sealing around the lower portion of the piston sleeve and defining the lower end of the chamber 278. Once the piston sleeve has been moved to compress the packing rings of the packing assembly into sealing engagement with the flexible line W, the well fluid will act on the piston sleeve and packing to maintain the same in sealing condition. The pressure within the chamber 278 therefore need no longer be high to maintain such compression. To reduce the compression of the sealing assembly 260, the pressure in the chamber 279 acts in opposition to the pressure in the chamber 278 and in opposition to the well fluid pressure acting on the lower end of the piston sleeve and the packing carried thereby, to resist further compressive movement of the packing toward sealing engagement with the flexible line and so to reduce the friction of such engagement.

Obviously, therefore, by varying the effective annular area of the piston head on the piston sleeve exposed to control fluid pressure as compared to the area of the piston sleeve sealed off between the lower seal engaging the sleeve and the flexible line W the magnitude of control pressure differential applied to the piston sleeve may be controlled, as desired. The larger the effective area of the piston head exposed to control fluid pressure, the lower the control fluid pressure required to move the piston sleeve to control compression of the packing assembly. Thus, by controlling the effective area of the piston head to provide a larger area ratio, relative low control fluid pressure may be utilized more safely and economically, with lighter more portable equipment for controlling high well fluid pressures acting on the packing assembly of the stuffing box assembly. Also, the control fluid pressures applied to the opposed effective piston head areas of the piston sleeve to control compression of the packing assembly may likewise be lower.

It will readily be seen that the packing may be compressed easily until substantially all of the sealing rings have been consumed before any leakage will occur. It will further particularly be seen that the fact that the packing is only compressed to seal against the flexible line to a sufficient degree to effect a seal without great frictional engagement with the line will reduce wear on the sealing element and permit the line to be lowered into the well under extremely high pressures without the use of exceedingly large weights on the tools and will so permit the flexible line to be readily moved through the stuffing box to manipulate the tools without restricting such movement unduly. It will also be seen that the stuffing box assembly provides for the application of lubricant or corrosive inhibiting compounds to the flexible line passing therethrough, and that it likewise provides means for conducting any well fluids leaking past the packing gland assembly 260 through the exit conduit E to a remote point for disposal without danger of fire or the like. The antifriction sheave ring of FIGS. 2 and 5 also may be applied to the wheel over which the wire line runs through the stuffing box into and out of the well.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A fluid pressure controlled wire line stuffing box for sealing around flexible lines, including: a housing having a longitudinal passage therethrough; means providing upper and lower end portions of reduced diameter in said passage with the portion of the bore of the passage of said housing between said means providing a large diameter chamber area; an elongate movable tubular piston sleeve slidable in the passage of said housing having its tubular ends slidable longitudinally in sealed engagement in the reduced upper and lower end portions of the housing passage and having an enlarged external annular piston flange intermediate its ends slidable in sealed engagement in the enlarged chamber area of the housing between the reduced end portions thereof to divide the chamber area in the enlarged bore of said passage into two pressure chambers, one on each side of said flange; said piston sleeve having a longitudinal bore therethrough reduced in diameter at one end portion, said reduced bore forming shoulder stop means for supporting a set of packing rings in the bore of said movable piston sleeve for movement therewith; a set of packing rings supported in the bore of said piston sleeve with one end of said set engaging said shoulder stop means in said bore to prevent movement of such one end of said set of packing rings in said bore in the direction of said shoulder stop means and the other end of said set exposed and movable in said bore of said piston sleeve; an elongate tubular compressing sleeve having one end telescoping into the open end of the bore of said piston sleeve opposite said reduced bore and engaging the exposed movable end of the set of packing rings in said piston sleeve bore and having its opposite end engaging a shoulder in the reduced upper end portion of the passage of the housing to be held against longitudinal upward movement in the housing; said piston sleeve being movable longitudinally in said housing passage toward and away from said compressing sleeve whereby longitudinal movement of said piston sleeve toward said compressing sleeve compresses and distorts the packing rings in the bore of the piston sleeve into sealing relationship with a flexible line extending through the bore of the packing rings and the passage of the housing; first fluid pressure conduit means connected to one of the pressure chambers in the housing passage on one side of said piston flange; second fluid passage conduit means connected to the housing and communicating with the other pressure chamber in the housing passage on the opposite side of said piston flange; said pressure fluid conduit means providing means for introducing pressure fluid into the pressure chambers on the opposite sides of said piston flange for controlling movement of said piston sleeve longitudinally of said housing passage toward and away from said compressing sleeve to control the compression of the packing rings in the bore of said piston sleeve, whereby said packing rings may be deformed into tight sealing engagement with said flexible line extending therethrough and the compression of the packing rings then reduced to a minimum effective sealing engagement with said flexible line by adjustment of the control fluid pressure on the opposite sides of the piston flange, whereby frictional engagement of the packing rings with the flexible line and wear of the packing rings due to movement of the line therethrough is reduced.

2. A stuffing box of the character set forth in claim 1 wherein: one of said means providing the reduced diameter passage in upper and lower end portions of the housing passage is removable therefrom to permit installation and removal of the piston sleeve and packing rings therein.

3. A wire line stuffing box of the character set forth in claim 1, wherein each of the means providing the reduced diameter portions in the passage of the housing at opposite ends thereof is removable from the passage of the housing to permit servicing the piston sleeve and ready replacement of packing rings contained therein.

4. A stuffing box of the character set forth in claim 1, wherein a wiper seal is provided in the upper reduced diameter portion of the passage of the housing spaced longitudinally of the passage above the piston sleeve and defining a third chamber in said passage of said housing spaced from the control fluid pressure chambers therein; conductor means communicating with the third chamber in the passage of the housing between the packing rings in the piston sleeve and the wiper seal for conducting fluids passing through the packing rings in the piston sleeve with the flexible line from said third chamber to a remote point for disposal.

5. A stuffing box assembly of the character set forth in claim 4, wherein said conductor means communicating with the third chamber also provides means for introducing corrosion inhibitor or lubricant or both into said third chamber for treating the flexible line moving into and out of the well flow conductor through the stuffing box.

6. In a wire line stuffing box for sealing around a flexible line, a packing ring assembly comprising: a set of a plurality of separate tubular sealing ring members in longitudinally aligned position between bored compressing means at the opposite ends of said set, each of said sealing ring members having a bore larger than the diameter of the flexible line to be passed through the stuffing box and larger than the minimum bores of the compressing means; the sealing ring member on one end of the set comprising a hard ring formed of fabric wound spirally about the longitudinal axis of the bore of the ring member and bonded by an oil resistant synthetic elastomeric material; the ring next adjacent said one ring member being formed of a plurality of transversely disposed layers of glass fiber or nylon fabric bonded by an oil-resistant elastomeric material; at least one ring member adjoining the second ring member formed of low-friction high wear-resistant elastomeric material; and a follower ring member on the other end of said set of packing rings comprising a plurality of transverse layers of glass fiber or nylon fabric bonded together by an oil resistant elastomeric material; the bores of the packing ring members all being greater than the diameter of the flexible line to be passed therethrough, whereby the flexible line may pass through said ring members without engaging the same until the ring members have been compressed longitudinally by the compressing means to deform them into engagement with said flexible line.

7. In combination with the fluid pressure controlled wire line stuffing box of claim 1, wherein the reduced frictional engagement of the packing rings with the flexible line provides for more ready and rapid movement of said flexible line through said stuffing box: a rotatable sheave means connected with the housing and operable to direct said flexible line into and out of said housing through the housing passage and the packing rings therein and into and out of a well flow conductor; mount means swingably mounting said sheave means on said housing for swingable movement of said sheave means about the upper end of the housing around the longitudinal axis of said housing with said flexible line entering the passage of said housing in longitudinal axial alignment with the axis of said housing passage; said sheave means comprising a wheel and a rim sheave section movable thereon; anti-frictional means between the wheel and sheave rim section; said sheave rim section having an external groove thereon in which the flexible line is movable to be guided into the housing passage of the stuffing box; said antifrictional means between said rim section and the wheel permitting rotational movement of the wheel while the rim section of the sheave is held stationary, to permit movement of the flexible line through the stuffing box housing passage and the packing rings therein to be stopped abruptly while moving readily at a rapid rate through the stuffing box, without wear and deformation of said flexible line resulting from continued momentum rotation of the sheave wheel and to prevent damage of the packing rings in said stuffing because of damage to the flexible line which would otherwise be caused by continued rotation of said sheave wheel, and which would result in loss of the sealing engagement of said packing rings with said flexible line and flow of fluids past said packing rings into the surrounding areas.

8. A fluid pressure controlled wire line stuffing box including: a housing having an elongate passage therethrough; an elongated tubular packing ring assembly in said housing passage compressible to contracted position to seal around a flexible line extending through said housing passage; and fluid pressure operated means for controlling the compression of the packing ring assembly in the housing to control the engagement of the said packing ring assembly with the flexible line extending through said housing comprising: an elongate movable tubular piston sleeve movable longitudinally in the passage of said housing and having a longitudinal bore in which said packing ring assembly is disposed; a fixed elongate tubular compression sleeve in said housing telescoping into the bore of said piston sleeve to engage the packing ring assembly in said bore to compress said packing ring assembly in said bore; said piston sleeve also having an external piston flange intermediate its ends slidable sealingly in the passage of said housing; means at the opposite ends of said housing passage sealing between the ends of said piston sleeve on opposite sides of said flange to provide two pressure chambers in said housing, one on each side of said piston flange on said piston sleeve; means for conducting control fluid pressure to said chambers to act on the piston flange to control the movement of said movable piston sleeve in said passage of said housing toward and away from said compression sleeve for controlling the compression of the packing ring assembly in the bore of said piston sleeve to control the engagement of said packing ring assembly with the flexible line extending through the housing passage.

9. A fluid pressure controlled wire line stuffing box of the character set forth in claim 1, wherein: said set of packing rings have bores therethrough larger than the flexible line against which they are disposed to seal when distorted within the movable piston sleeve, one end of said set of packing rings having a tubular follower compression ring engaging said shoulder stop means in said piston sleeve and the opposite end of said set of packing rings having a tubular follower compression ring engaged by said compression sleeve telescoped into the bore of the piston sleeve whereby movement of the piston sleeve toward and away from said compression sleeve compresses and distorts said set of packing rings to reduce the bore of said rings and move said rings into sealing engagement with the flexible line and releases said set of packing rings from such compression for movement out of engagement with said flexible line, the control fluid pressure acting on opposite sides of said piston flange in said chambers for controlling the force with which said sealing packing rings arecompressed to engage said flexible line.

10. A fluid pressure controlled wire line stuffing box of the character set forth in claim 1, wherein said set of packing rings in said movable piston sleeve in said housing comprises: a plurality of separate tubular sealing ring members in longitudinally aligned position between bored compressing means at the opposite ends of said set, each of said sealing ring members having a bore larger than the diameter of the flexible line to be passed through the stuffing box and larger than the minimum bores of the compressing means; the sealing ring member on one end of the set comprising a hard ring formed of fabric wound spirally about the longitudinal axis of the bore of the ring member and bonded by an oil resistant synthetic elastomeric material; the ring next adjacent said one ring member being formed of a plurality of transversely disposed layers of glass fiber or nylon fabric bonded by an oil-resistant elastomeric material; at least one ring member adjoining the second ring member formed of low-friction high wear-resistant elastomeric material; and a follower ring member on the other end of said set of packing rings comprising a plurality of transverse layers of glass fiber or nylon fabric bonded together by an oil resistant elastomeric material; the bores of the packing ring members and the bored compressing means all being greater than the diamter of the flexible line to be passed therethrough, whereby the flexible line may pass through said packing ring members without engaging the same until the packing ring members have been compressed longitudinally by the compressing means to deform them into engagement with said flexible line.

11. A fluid pressure controlled wire line stuffing box of the character set forth in claim 10 wherein: a wiper seal is provided in the housing spaced longitudinally from the packing assembly therein and defining a separate chamber in said housing for receiving fluid pressure passing the packing assembly; conductor means communicating with said separate chamber in said housing for conducting fluids passing through the packing assembly with the flexible line from said chamber to a remote point for disposal.

12. A stuffing box assembly of the character set forth in claim 11 wherein: said conductor means for conducting fluids from said separate chamber of said housing between said wiper seal and said packing assembly also provides means for introducing corrosion inhibitor or lubricant or both into said chamber for treating the flexible line moving through the stuffing box.

13. A fluid pressure controlled wire line stuffing box of the character set forth in claim 8 wherein: said packing ring assembly in said housing comprises: a plurality of separate tubular sealing ring members in longitudinally aligned position between bored compressing means at the opposite ends of said set, each of said sealing ring members having a bore larger than the diameter of the flexible line to be passed through the stuffing box and larger than the minimum bores of the compressing means; the sealing ring member on one end of the set comprising a hard ring formed of fabric wound spirally about the longitudinal axis of the bore of the ring member and bonded by an oil-resistant synthetic elastomeric material; the ring next adjacent said one ring member being formed of a plurality of transversely disposed layers of glass fiber or nylon fabric bonded by an oil-resistant elastomeric material; at least one ring member adjoining the second ring member formed of low-friction high wear-resistant elastomeric material; and a follower ring member on the other end of said set of packing rings comprising a plurality of transverse layers of glass fiber or nylon fabric bonded together by an oil-resistant elastomeric material; the bores of the packing ring members when relaxed and the bored compressing means all being greater than the diameter of the flexible line to be passed therethrough, whereby the flexible line may pass through said packing ring members without engaging the same until the packing ring members have been compressed longitudinally by the compressing means to deform then into engagement with said flexible line.

* * * * *